United States Patent Office 3,096,141
Patented July 2, 1963

3,096,141
PRINTING PASTE CONTAINING AN ORGANIC SULPHUR COMPOUND AND A DYESTUFF CARRYING A 4:6-DIHALOGENO-1:3:5-TRIAZIN-2-YLAMINO GROUP, AND METHOD OF PRINTING
George Arthur Bennett, William Clarke, and John Stirling, all of Manchester, England, assignors to Imperial Chemical Industries Limited, London, England, a corporation of Great Britain
No Drawing. Filed June 29, 1960, Ser. No. 39,460
Claims priority, application Great Britain Aug. 27, 1959
7 Claims. (Cl. 8—63)

This invention relates to an improved colouring process and more particularly it relates to an improved printing process for textile materials.

It is known that dyestuffs containing at least one 4:6-dihalogeno-1:3:5-triazin-2-ylamino group can be used for colouring textile materials by a printing process. It has however been found that when print pastes containing such dyestuffs are stored before use, as frequently occurs in practice, the dyestuffs are partially hydrolysed with the result that such print pastes, when applied to textile materials, give prints of much lower colour value than prints obtained from freshly-prepared print pastes which has not been stored before use.

It has now been found that the stability to storage of print pastes containing dyestuffs which carry at least one 4:6-dihalogeno-1:3:5-triazin-2-ylamino group can be markedly improved by adding organic derivatives of sulphur to the said print pastes.

According to the invention there is provided a process for printing textile materials which comprises applying to the textile materials a print paste containing a sulphur compound of the formula: D—S—X, wherein D is a hydrogen or metal and X is an organic radical, and a dyestuff carrying at least one 4:6-dihalogeno-1:3:5-triazin-2-ylamino group.

The metal represented by D may be an alkaline earth metal such as calcium or barium but is preferably an alkali metal such as sodium or potassium.

The organic radical represented by X may be substituted or unsubstituted hydrocarbon radical for example an alkyl radical which is preferably a lower alkyl radical such as methyl, ethyl, propyl and butyl, a substituted alkyl radical which is preferably a substituted lower alkyl radical such as hydroxyethyl, methoxyethyl, ethoxyethyl and carboxymethyl, a cycloalkyl radical such as cyclohexyl, an aralkyl radical such as benzyl, an aryl radical for example a monocyclic aryl radical such as phenyl or a bicyclic aryl radical such as naphthyl, which aryl radicals may contain substituents such as chlorine atoms or alkyl, alkoxy, sulphonic acid, nitro or carboxylic acid groups, or it may be a substituted or unsubstituted heterocyclic radical in particular a 5- or 6-membered heterocyclic radical which may contain substitutents or form part of a condensed ring system, such as a thiazolyl, benzthiazolyl, naphthathiazolyl, pyridyl, furyl, benzoxazolyl, benzselenazolyl, pyrrolidyl, quinolyl, 6-nitrobenzthiazolyl and 5-chlorobenzthiazolyl radical, or X may represent a group of the formula:

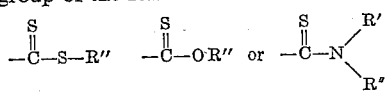

wherein R' represents a hydrogen atom or a substituted or unsubstituted hydrocarbon or heterocyclic radical, R" represents a substituted or unsubstituted hydrocarbon or heterocyclic radical or R' and R" may together with the nitrogen atom N form a 5- or 6-membered heterocyclic ring.

As examples of the substituted or unsubstituted hydrocarbon or heterocyclic radicals represented by R' and R" there may be mentioned alkyl radicals for example lower alkyl radicals such as methyl, ethyl, propyl and butyl, substituted alkyl radicals for example substituted lower alkyl radicals such as hydroxyethyl, cycloalkyl radicals such as cyclohexyl, aralkyl radicals such as benzyl, aryl radicals for example monocyclic aryl radicals such as phenyl and bicyclic aryl radicals such as naphthyl, substituted aryl radicals for example substituted monocyclic aryl radicals such as chlorophenyl, carboxyphenyl, and sulphophenyl, and heterocyclic radicals such as pyridyl and morpholino.

As examples of the 5- or 6-membered rings formed by joining R', R" and the nitrogen atom N together there may be mentioned piperidyl and morpholino.

The process of the invention may be conveniently brought about by applying the print paste containing a sulphur compound, as hereinbefore defined, and a dyestuff carrying at least one 4:6-dihalogeno-1:3:5-triazin-2-ylamino group to the textile material by any of the methods known for applying print pastes to textile materials, for example by roller printing, screen printing, block printing, stencil printing or spraying, if necessary drying the printed textile material, and subsequently subjecting the printed textile material to the action of heat and/or steam.

In carrying out the printing process it is preferred to treat the textile material with an acid-binding agent before, during or after the application of the print paste. Thus for example the textile material can be padded through an aqueous solution of an acid-binding agent such as sodium carbonate and the so-treated textile material subsequently dried before being treated with the print paste. Alternatively the acid-binding agent can be incorporated in the print paste, or the textile material which has been printed with the print paste can be dried, immersed in an aqueous solution of an acid-binding agent and the so-treated printed textile material dried and then subjected to the action of heat and/or steam.

As examples of acid-binding agents which can be used there may be mentioned sodium carbonate, trisodium phosphate and sodium metasilicate, or if desired substances such as sodium bicarbonate or sodium trichloroacetate can be used which on heating or steaming liberate an acid-binding agent.

There may also be present in the print paste substances which are commonly added to print pastes such as urea, sodium m-nitrobenzenesulphonate and ethanol, and thickening agents such as ethyl cellulose, starch, locust bean gum, oil-in-water emulsions and water-in-oil emulsions but the preferred thickening agents are alginates such as sodium alginate.

According to a further feature of the invention there are provided as new compositions of matter print pastes comprising, as the essential ingredients, a dyestuff containing at least one 4:6-dihalogeno-1:3:5-triazin-2-ylamino group, a sulphur compound as hereinbefore defined, a thickening agent and water.

The dyestuffs carrying at least one 4:6-dihalogeno-1:3:5-triazin-2-ylamino group which are present in the print paste may be obtained by reacting a dyestuff compound containing at least one primary or secondary amino group with a 2:4:6-trihalogeno-1:3:5-triazine such as 2:4:6-tribromo-1:3:5-triazine and preferably 2:4:6-trichloro-1:3:5-triazine.

Each of the 4:6-dihalogeno-1:3:5-triazin-2-ylamino groups, which are preferably 4:6-dichloro-1:3:5-triazin-2-ylamino groups, are attached to a carbon atom of an aryl residue present in the dyestuff, or each of the said groups is attached to a carbon atom of an alkyl chain which is directly attached to an aryl residue present in the dyestuff or which is attached to an aryl residue through a bridging atom or group. As examples of such bridging atoms or groups there may be mentioned —O—, —S—, —SO₂—, $$-SO_2NH,\ -SO_2N\text{-alkyl and}\ -CONH$$

The dyestuffs carrying at least one 4:6-dihalogeno-1:3:5-triazin-2-ylamino group may be dyestuffs of any of the known dyestuffs series carrying at least one such group, but preferably they are dyestuffs of the azo, which may be monoazo or polyazo, nitro, anthraquinone and phthalocyanine series carrying at least one such group. If desired the dyestuffs may contain at least one coordinately bound metal atom such as a coordinately bound copper, chromium or cobalt atom. The dyestuffs preferably contain at least one water-solubilising group such as an acylsulphonamide, alkylsulphone, carboxylic acid and above all a sulphonic acid group.

Examples of dyestuffs carrying at least one 4:6-dihalogeno-1:3:5-triazin-2-ylamino group which can be present in the print paste are described in British specifications Nos. 209,723, 298,494, 467,815, 503,609, 772,030, 774,925, 781,930, 785,120, 785,222, 805,562, 826,405, 828,353, 829,042, 836,248, 837,035, 837,124, 837,985 and 837,990; in Belgian specifications Nos. 556,092, 558,390, 558,801, 558,816, 558,817, 558,884, 558,957, 559,782, 559,945, 560,578, 560,791, 560,792, 560,793, 560,794, 560,795, 560,839, 563,862 and 569,115; and in Italian specifications Nos. 574,744, 577,309, 582,676 and 594,999.

As specific examples of the sulphur compounds of the formula D—S—X, as hereinbefore defined, which can be present in the print pastes there may be mentioned thioglycollic acid, methyl mercaptan, phenylmercaptan, sodium diethyldithiocarbamate, sodium N-methyl-N-phenyldithiocarbamate, sodium pentamethylenedithiocarbamate, potassium dipropyldithiocarbamate, sodium diphenyldithiocarbamate, potassium ethylxanthate, ethyltrithiocarbonate, sodium phenylxanthate, sodium salt of 2-mercaptobenzthiazole, potassium salt of 2-mercapto-β-naphthothiazole, 2 - mercaptothiophene, 2 - mercapto-4-methylthiazole, 2-mercapto-4-, 5-, 6- or 7-methylbenzthiazole, 2-mercapto-6-nitrobenzthiazole, 2-mercapto-6- or 7-chlorobenzthiazole, 2-mercapto-4:5-benzo-1:3-thiazine, 2-mercaptobenzoxazole, 2-mercaptobenziminazole, 2-mercaptobenzselenazole, 2-mercaptopyrrole, 2-mercaptopyrrolidine, 2-mercaptopyridine, 4-mercaptopyridine, 2-mercaptopyrimidine and 2-mercaptoquinoline.

One preferred class of the sulphur compounds are the compounds which are represented by the formula:

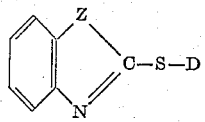

wherein D has the meaning stated above, Z represents a selenium or preferably a sulphur atom and the benzene ring may carry substituents such as chlorine atoms or alkyl, alkoxy, nitro, acetylamino, carboxylic acid or sulphonic acid groups.

A second preferred class of the sulphur compounds are the compounds which are represented by the formula:

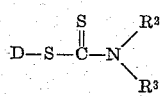

wherein D has the meaning stated above, R² represents an alkyl radical, which is preferably a lower alkyl radical, and R³ represents an alkyl radical, which is preferably a lower alkyl radical, a cyclohexyl radical or a monocyclic aryl radical.

The quantity of the sulphur compound, as hereinbefore defined, present in the print paste is preferably that which corresponds to one molecular proportion of the sulphur compound for each dihalogenotriazinylamino group in the dyestuff, but if desired larger amounts of the sulphur compound can be present.

As examples of textile materials which can be printed by the process of the invention there may be mentioned cellulose textile materials such as cotton, linen and viscose rayon and natural and regenerated protein fibres such as wool and silk.

The printed textile materials obtained by the process of the invention have excellent fastness to wet treatments such as washing.

The invention is illustrated but not limited by the following examples in which the parts are by weight:

Example 1

Two print pastes are prepared comprising:

| | A, parts | B, parts |
|---|---|---|
| 1-(4':6'-dichloro-1':3':5'-triazin-2'-ylamino)-7-phenylazo-8-naphthol-3:6-disulphonic acid (disodium salt) | 2 | 2 |
| Sodium diethyldithiocarbamate | 0.5 | |
| Urea | 15 | 15 |
| Sodium bicarbonate | 1.5 | 1.5 |
| Sodium m-nitrobenzenesulphonate | 1 | 1 |
| Sodium alginate | 1.6 | 1.6 |
| Sodium hexametaphosphate | 0.4 | 0.4 |
| Water | 78 | 78.5 |
| | 100 | 100 | and each of the print pastes is divided into 2 portions.

One portion of the print paste A is applied to woven cotton cloth by roller printing and the printed cotton cloth is dried at 70° C., then steamed for 10 minutes at atmospheric pressure. The printed cotton cloth is then "soaped" for 5 minutes in a 0.3% aqueous solution of a condensate of ethylene oxide with an alkylated phenol at a temperature of 100° C., rinsed in water and dried.

The second portion of the print paste A is stored for 10 days at a temperature of 15° C. and is then printed on to woven cotton cloth by the method described above.

One portion of the print paste B is applied to woven cotton cloth by the method described above and the second portion of the print paste B is stored for 10 days at a temperature of 15° C. and is then similarly applied to woven cotton cloth.

A comparison of the printed cotton cloths so obtained shows that in the case of the 2 prints obtained from print paste A, which contains sodium diethyldithiocarbamate, there is little or no difference in the tinctorial strengths of the 2 prints, whereas in the case of the 2 prints obtained from print paste B, which does not contain sodium diethyldithiocarbamate, the print obtained from the print paste which was stored for 10 days is markedly weaker than the print obtained from the freshly prepared print paste.

Example 2

In place of the 2 parts of the 1-(4':6'-dichloro-1':3':5'-triazin - 2' - ylamino) - 7 - phenylazo - 8 - naphthol - 3:6-disulphonic acid (disodium salt) used in Example 1 there are used 2 parts of 1-(2':5'-dichloro-4'-sulphophenyl) - 3 - methyl - 4 - [3″ - (4‴:6‴ - dichloro - 1‴:3‴:5‴ - triazin - 2‴ - ylamino) - 2″ - sulphophenylazo]-5-pyrazolone (disodium salt) and in place of the 0.5 part of sodium diethyldithiocarbamate there is used 0.6 part of sodium diethyldithiocarbamate when similar results are obtained.

Example 3

Two print pastes are prepared having the compositions given in Example 1 except that in print paste A there is used 0.6 part of the sodium salt of 2-mercaptobenzthiazole in place of the 0.5 part of sodium diethyldithiocarbamate. Each of the two print pastes is then divided into 2 portions and the 4 portions are then applied as described in Example 1.

A comparison of the printed cotton cloths so obtained shows that in the case of the print paste containing the sodium salt of 2-mercaptobenzthiazole there is little or no difference in the tinctorial strengths of the print obtained from the freshly prepared print paste and the print obtained from the print paste which was stored for 10 days, whereas in the case of the print paste which does not contain the sodium salt of 2-mercaptobenzthiazole the print obtained from the print paste which was stored for 10 days is markedly weaker than the print obtained from the freshly prepared print paste.

Further pairs of print pastes are prepared as described in Example 1 except that the 2 parts of the dyestuff present in each of the print pastes A and B are replaced by the quantity of the dyestuff listed in the second column of the following table and the 0.5 part of sodium diethyldithiocarbamate present in print paste A is replaced by the quantity of the sulphur compound listed in the third column of the table. The pairs of print pastes are then applied to woven cotton cloth as described in Example 1. For each pair of print pastes a comparison of the printed cotton cloths so obtained shows that in the case of the 2 prints obtained from the print paste containing the sulphur compound there is little or no difference in the tinctorial strengths of the print obtained from the freshly prepared print paste and the print obtained from the print paste which was stored for 10 days at 15° C., whereas in the case of the 2 prints obtained from the print paste which did not contain the sulphur compound the print obtained from the print paste which was stored for 10 days at a temperature of 15° C. is markedly weaker than the print obtained from the freshly prepared print paste.

| Example | Dyestuff | Sulphur Compound |
|---|---|---|
| 4 | 2.3 parts of the disodium salt of 1-(4':6'-dichloro-1':3':5'-triazin-2'-ylamino)-7-phenylazo-8-naphthol-3:6-disulphonic acid. | 0.73 part of the sodium salt of 5-methoxy-2-mercaptobenzthiazole. |
| 5 | do | 0.63 part of the sodium salt of 5-methyl-2-mercaptobenzthiazole. |
| 6 | do | 0.75 part of the potassium salt of 2-mercaptobenzselenazole. |
| 7 | do | 0.52 part of 2-mercaptobenzoxazole. |
| 8 | do | 0.78 part of the sodium salt of 5-acetylamino-2-mercaptobenzthiazole. |
| 9 | do | 0.6 part of sodium pentamethylenedithiocarbamate. |
| 10 | do | 0.6 part of sodium N-morpholinodithioformate. |
| 11 | 4.2 parts of the trisodium salt of the copper complex of 2-(4':6'-dichloro-1':3':5'-triazin-2'-ylamino)-6-(2''-hydroxy-5''-sulphophenylazo)-5-naphthol-1:7-disulphonic acid. | 0.71 part of 2-mercaptobenzoxazole. |
| 12 | do | 0.9 part of the sodium salt of 2-mercaptobenzthiazole. |
| 13 | 3.7 parts of the trisodium salt of 1-amino-4-[4'-(4''':6''-dichloro-1'':3''':5''-triazin-2''-ylamino)-anilino]anthraquinone-2:3':5-trisulphonic acid. | 0.9 part of sodium N-methyl-N-phenyldithiocarbamate. |
| 14 | do | 0.63 part of the sodium salt of 2-mercaptooxazole. |
| 15 | do | 0.76 part of sodium N-morpholinodithioformate. |
| 16 | do | 0.8 part of sodium salt of 2-mercaptobenzthiazole. |

What we claim is:

1. Process for printing textile materials which comprises applying to the textile materials a print paste containing as essential ingredients, firstly a sulphur compound of the formula: D—S—X, wherein D is selected from the group consisting of hydrogen and metal; X is an organic radical selected from the group consisting of alkyl; hydroxyalkyl; alkoxyalkyl; carboxyalkyl; cycloalkyl; aralkyl; aryl; and aryl carrying a substituent selected from the class consisting of chlorine, alkyl, alkoxy, sulphonic acid, nitro, and carboxylic acid groups; and a heterocyclic ring system of the class consisting of thiazolyl, benzthiazolyl, naphthathiazolyl, pyridyl, furyl, benzoxazolyl, benzselenazolyl, pyrrolidyl, quinolyl, 6-nitrobenzthiazolyl, and 5-chlorobenzthiazolyl radical; and a group having one of the formulae:

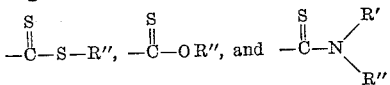

wherein
$R'$ is selected from hydrogen, hydrocarbon, and heterocyclic radicals;
$R''$ is selected from hydrocarbon and heterocyclic radicals; and wherein
$R'$ and $R''$ together with the nitrogen atom N form a heterocyclic ring having from 5 to 7 members;

and secondly a dyestuff compound having a chromophoric group selected from the class consisting of azo, anthraquinone, nitro, and phthalocyanine chromophoric groups, carrying a 4:6-dihalogeno-1:3:5-triazin-2-ylamino group.

2. Process as claimed in claim 1 wherein the dyestuff is a water-soluble dyestuff carrying at least one 4:6-dichloro-1:3:5-triazin-2-ylamino group.

3. Process as claimed in claim 1 wherein the textile material is treated with an acid-binding agent before, during or after the application of the print paste.

4. Process as claimed in claim 1 wherein the sulphur compound is a compound of the formula:

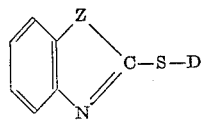

wherein D is selected from the group consisting of hydrogen and metal atoms, Z represents a member selected from the group consisting of selenium and sulphur atom and the benzene ring may carry substituents selected from the group consisting of chlorine, alkyl, alkoxy, nitro, acetylamino, carboxylic acid, and sulphonic acid groups.

5. Process as claimed in claim 1 wherein the sulphur compound is a compound of the formula:

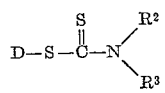

wherein D is selected from the group consisting of hydrogen and metal atoms, $R^2$ represents an alkyl radical and $R^3$ represents a member selected from the group consisting of an alkyl radical, a cyclohexyl radical and a monocyclic aryl radical.

6. Process as claimed in claim 1 wherein the textile materials are cellulose textile materials.

7. A print paste composition of matter consisting essentially of (a) a sulphur compound of the formula: D—S—X, wherein D is selected from the group consisting of hydrogen and metal; X is an organic metal selected from the group consisting of alkyl; hydroxyalkyl; alkoxyalkyl; carboxyalkyl; cycloalkyl; aralkyl; aryl; and aryl carrying a substituent selected from the class consisting of chlorine, alkyl, alkoxy, sulphonic acid, nitro, and carboxylic acid groups; and a heterocyclic ring system of the class consisting of thiazolyl, benzthiazolyl, naphthathiazolyl, pyridyl, furyl, benzoxazolyl, benzselenazolyl, pyrrolidyl, quinolyl, 6-nitro-benzthiazolyl, and 5-chlorobenzthiazolyl radical; and a group having one of the formulae:

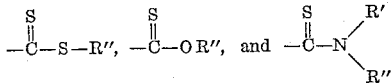

wherein
$R'$ is selected from hydrogen, hydrocarbon, and heterocyclic radicals;

R" is selected from hydrocarbon and heterocyclic radicals; and
wherein
R' and R" together with the nitrogen atom N form a heterocyclic ring having from 5 to 7 members;

(b) dyestuff having a chromophoric group selected from the class consiting of azo, anthraquinone, nitro, and phthalocyanine chromophoric groups, carrying a 4:6-dihalogeno-1:3:5-triazin-2-ylamino group; (c) a thickening agent; and (d) water.

References Cited in the file of this patent

UNITED STATES PATENTS

| | | |
|---|---|---|
| 1,933,962 | Bogemann et al. | Nov. 7, 1933 |
| 2,336,664 | Zwilgmeyer | Dec. 14, 1943 |
| 2,950,165 | Hadfield et al. | Aug. 23, 1960 |

FOREIGN PATENTS

| | | |
|---|---|---|
| 774,925 | Great Britain | May 15, 1957 |